United States Patent
Astl

[11] 4,210,533
[45] Jul. 1, 1980

[54] REMOTE CONTROL VALVE FOR REVERSE OSMOSIS WATER PURIFIER

[76] Inventor: Jaromir Astl, 626 Circle Dr., East, Solana Beach, Calif. 92075

[21] Appl. No.: 871,826

[22] Filed: Jan. 24, 1978

[51] Int. Cl.² .......................................... B01D 31/00
[52] U.S. Cl. .................................. 210/136; 210/194; 210/321 R; 210/418; 210/433 M; 137/599.1
[58] Field of Search .............. 210/136, 257 M, 321 R, 210/321 A, 418, 433 M, 134, 194, 420, 424; 137/882, 861, 594, 883, 599.1; 417/185

[56] References Cited

U.S. PATENT DOCUMENTS

| | | | |
|---|---|---|---|
| Re. 25,037 | 9/1961 | Brazier | 137/599.1 |
| 2,164,153 | 6/1939 | Friedrich | 137/599.1 |
| 2,640,494 | 6/1953 | Kovnovsky | 137/601 |
| 3,257,180 | 6/1966 | King | 137/599.1 |
| 3,620,241 | 11/1971 | Brown | 137/216 |
| 3,716,141 | 2/1973 | Spatz | 210/194 |

*Primary Examiner*—Thomas G. Wyse
*Assistant Examiner*—David R. Sadowski
*Attorney, Agent, or Firm*—Brown & Martin

[57] ABSTRACT

A remote control valve which regulates a reverse osmosis water purifier with only fluid connections between the control valve and the water purifier, no mechanical, electrical, or other such connections, being necessary. The control valve includes: a valve body having a purified water inlet, a brine inlet and a brine return outlet all connectible to the water purifier, having a waste outlet connectible to a drain, and having a purified water discharge outlet; a brine inlet valve controlling flow into the valve body through the brine inlet; manually operable means for opening the brine inlet valve; means for directing brine flow from the brine inlet to the brine return outlet upon opening of the brine inlet valve so as to pressurize the purified water in the water purifier, whereby purified water is delivered to the purified water discharge outlet; brine bleed means for metering brine from the brine inlet to the waste outlet when the brine inlet valve is closed; and purified water bleed means for delivering excess purified water to the waste outlet when the brine inlet valve is closed, thereby reducing the pressure on the purified water to atmospheric. A purified water nozzle means connects the purified water inlet to the purified water discharge outlet and bypasses the purified water bleed means when the brine inlet valve is open. A check valve means prevents brine flow through the waste outlet when the brine inlet valve is open, thereby directing all of the brine flow back to the water purifier by way of the brine return outlet.

4 Claims, 10 Drawing Figures

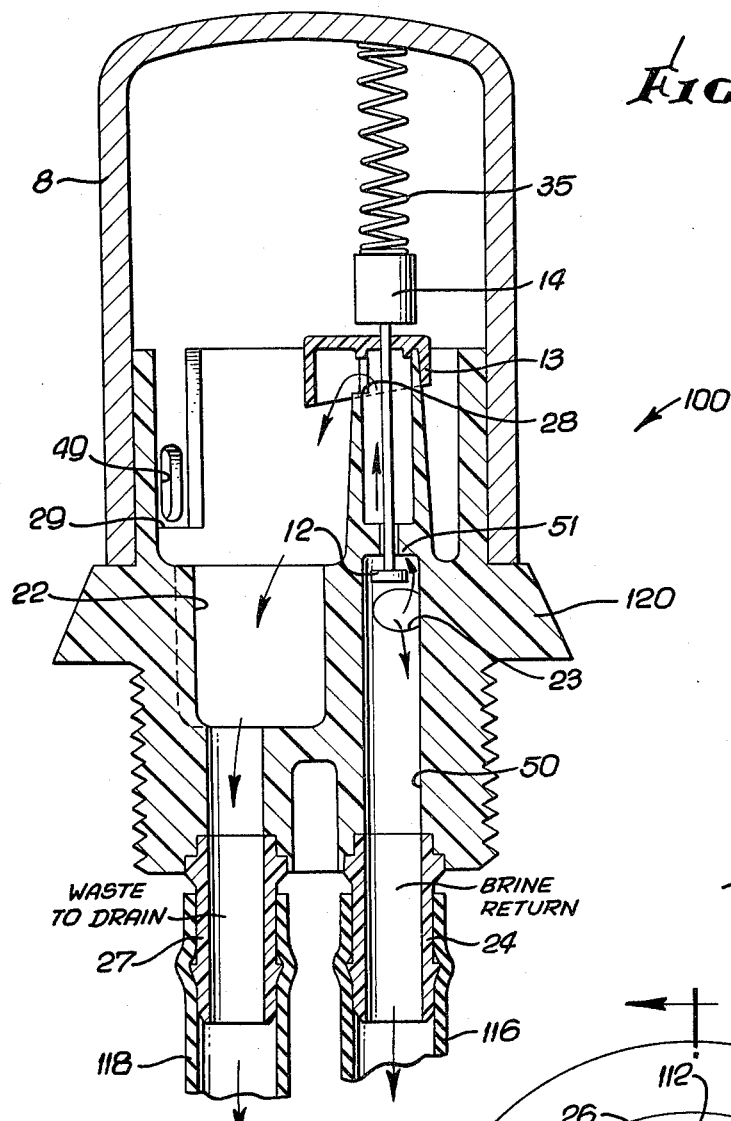
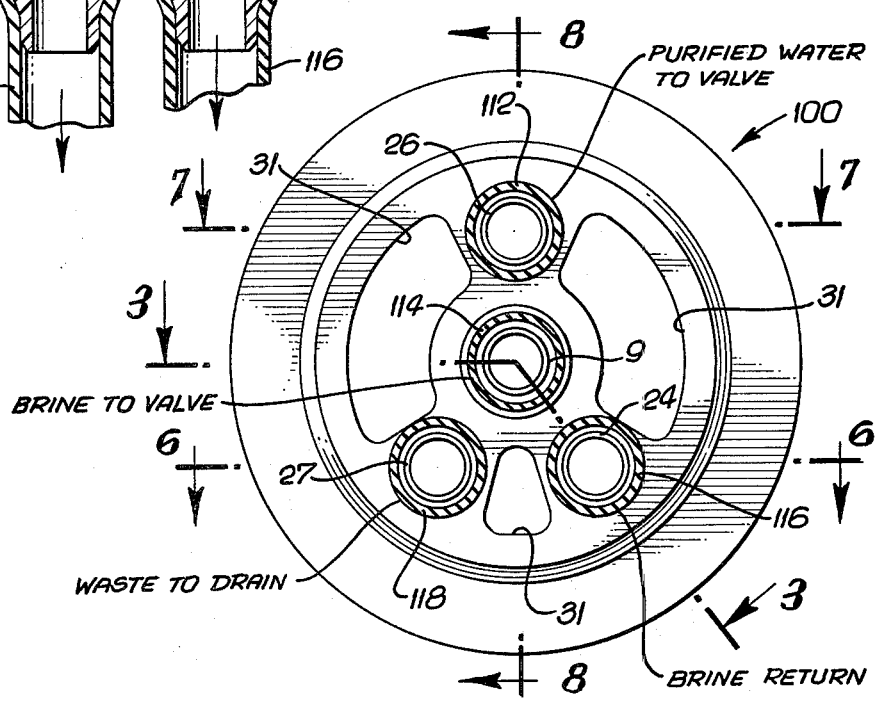

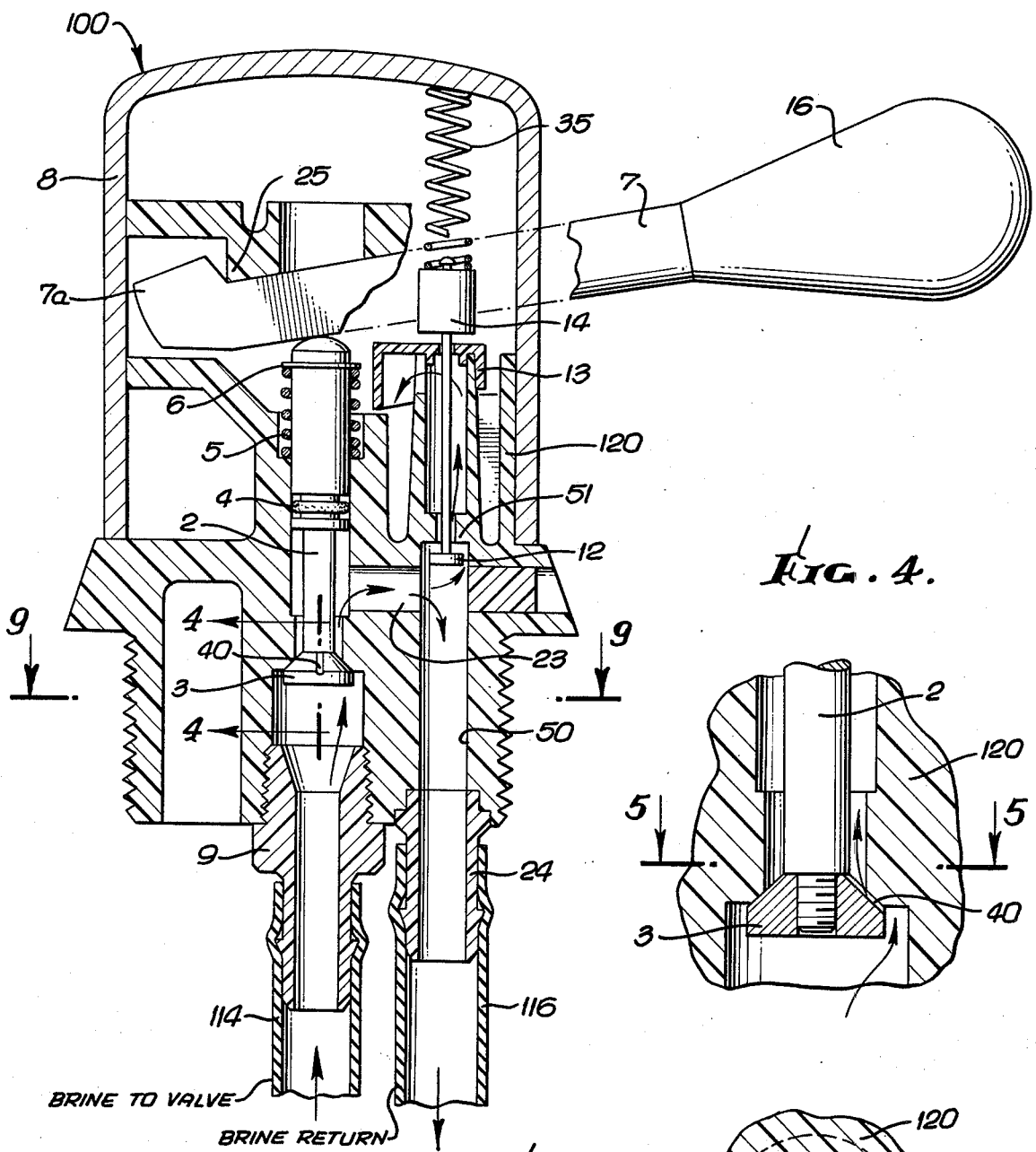

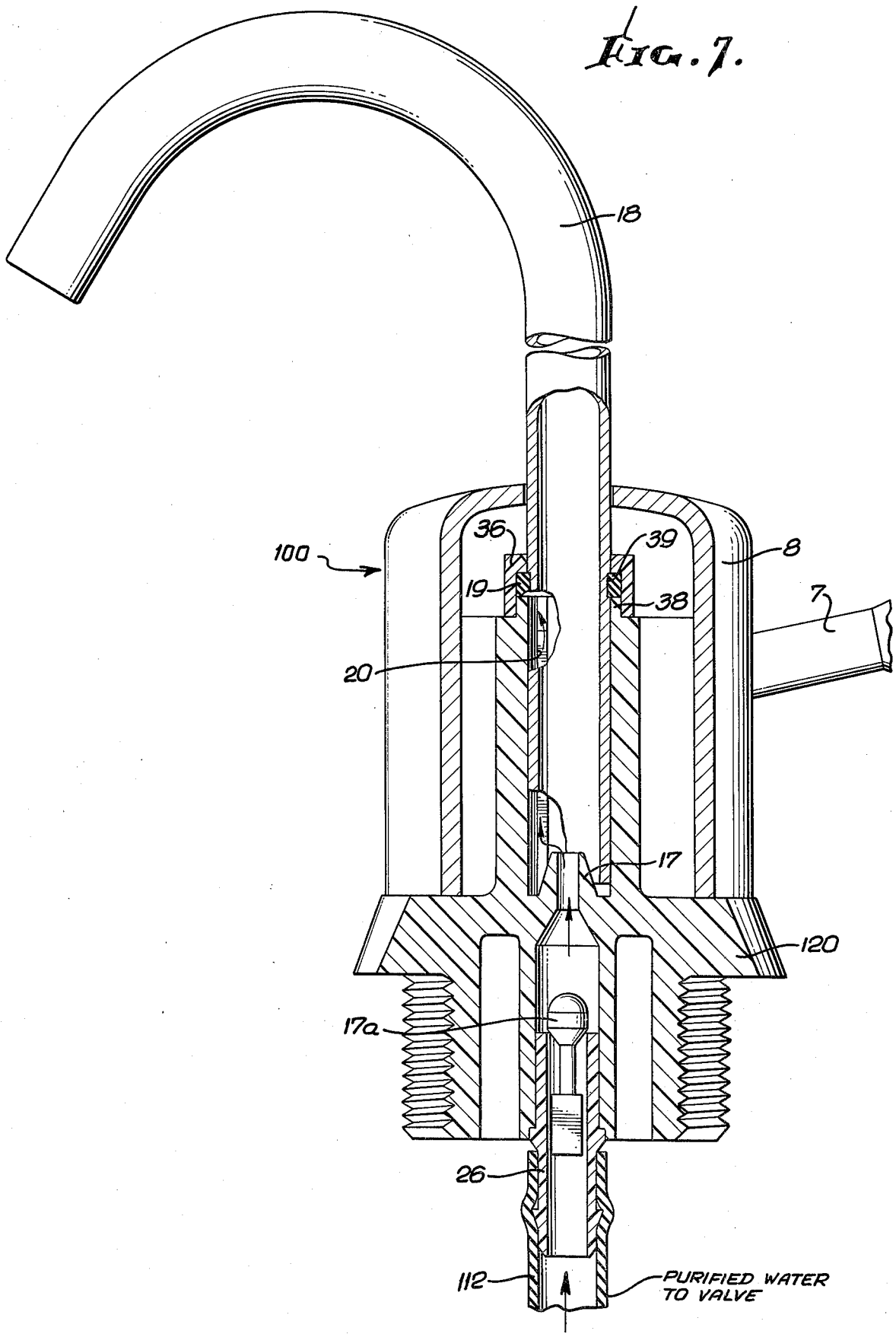

REMOTE CONTROL VALVE FOR REVERSE OSMOSIS WATER PURIFIER

BACKGROUND OF INVENTION

Water purifiers utilizing reverse osmosis technology are well known and all such devices require various control means for regulating their operation. One such water purifier is disclosed in my prior U.S. Pat. No. 3,719,593, issued Mar. 6, 1973.

The water purifier of my aforementioned patent produces purified water from feed water and stores the purified water in a reservoir which is pressurized substantially to feed water line pressure when the discharge of purified water is desired, the purified water being delivered to a faucet, or the like, which may be conveniently mounted on a kitchen sink, or a counter thereadjacent. The command to deliver purified water to the faucet is transmitted from the faucet to a control valve incorporated in the water purifier by means of a mechanical connection, which may be a wire push rod housed in a suitable conduit. One difficulty with this type of system is that it is usually installed in an atmosphere, such as that existing under a kitchen sink, which has a high humidity and is generally corrosive, due, for example, to the storage of chlorine containing materials in the same area. Under such conditions, it is difficult to maintain the mechanical connection mentioned in a freely operating, low friction state, which is an obvious disadvantage.

OBJECTS AND SUMMARY OF INVENTION

With the foregoing background in mind, a primary object of the invention is to provide a control faucet or valve for a reverse osmosis water purifier which is located remotely from the water purifier and which requires no mechanical, electrical, or other, similar, connection with the water purifier, thereby eliminating the problems arising from a high humidity, corrosive atmosphere in the area in which the water purifier is installed.

More particularly, a basic object is to provide a remote control valve for a reverse osmosis water purifier which is connected to the water purifier by fluid lines only. A related object is to provide a system wherein all of the valving, and other components, necessary to regulate the operation of the water purifier are located in the remote control valve.

The invention may be summarized as comprising, and another important object is to provide, a remote control valve for a reverse osmosis water purifier which produces purified water and brine from feed water and which utilizes feed water line pressure to pressurize the purified water, wherein the control valve is positionable at a location spaced from the water purifier and includes only fluid means connectible to the water purifier for controlling the flow of feed water through the water purifier, the discharge of purified water from the water purifier, and the delivery of waste water to a drain.

Still more particularly, the invention may be further summarized as including, and yet another important object is to provide, a remote control valve for a reverse osmosis water purifier, including: a control valve body having means providing a purified water inlet, a brine inlet and a brine return outlet all connectible to corresponding zones of the water purifier, means providing a waste outlet connectible to a drain and means providing a purified water discharge outlet; a brine inlet valve controlling flow into the control valve body through the brine inlet; manually operable means for opening the brine inlet valve; means for directing brine flow from the brine inlet to the brine return outlet upon opening of the brine inlet valve so as to pressurize the purified water in the water purifier substantially to feed water line pressure, whereby the purified water is pressurized substantially to feed water line pressure and is delivered to the purified water discharge outlet; brine bleed means for metering brine from the brine inlet to the waste outlet when the brine inlet valve is closed; and purified water bleed means for delivering excess purified water to the waste outlet when the brine inlet valve is closed so as to maintain the pressure applied to the purified water substantially at atmospheric pressure under such conditions.

An additional object of the invention is to provide a remote control valve having purified water nozzle means, connecting the purified water inlet to the purified water discharge outlet, for bypassing the purified water bleed means when the brine inlet valve is open to discharge purified water.

Another object is to provide a remote control valve including check valve means for preventing brine flow through the waste outlet when the brine inlet valve is open.

Yet another object is to provide a remote control valve wherein the brine bleed means comprises a passage through the brine inlet valve.

A further object is to provide air gap means in the control valve for preventing contamination of the water purifier in the event of drain blockage.

Further summarizing the invention, during normal, steady state operation, i.e., when no purified water is being withdrawn, feed water enters the water purifier, wherein purified water is extracted, and emerges as brine delivered to the brine inlet of the control valve body. The brine bleed means meters brine from the brine inlet to the waste outlet at a rate such as to assure proper functioning of the reverse osmosis module in the water purifier. An air gap prevents back-flow contamination of the water purifier in the event of drain blockage. Upon actuation of the remote control valve for the purpose of discharging purified water, the brine inlet valve is opened and the flow of brine through the control valve is greatly increased, and returned to the water purifier by way of the brine return outlet. At this point, the brine bleed means is closed by the check valve means for preventing brine flow through the waste outlet. Under such conditions, the purified water reservoir is subjected to substantially the feed water line pressure, whereby purified water is discharged from the purified water discharge outlet, by way of the purified water nozzle means for bypassing the purified water bleed means. When the desired quantity of purified water has been delivered, the brine inlet valve, which is preferably spring loaded, is permitted to close, whereupon the foregoing, normal steady state operation is resumed. In other words, the pressure on the purified water in the water purifier is reduced substantially to atomspheric so that the reverse osmosis module can operate properly, and the brine bleed means resumes its function of metering brine from the brine inlet to the waste outlet. The purified water bleed means delivers any excess purified water to the waste outlet so as to obtain substantially atmospheric pressure in the purified water reservoir.

The foregoing objects, advantages, features and results of the invention, together with various other objects, advantages, features and results which will be evident to those skilled in the reverse osmosis water purifier art in the light of this disclosure, may be achieved with the exemplary embodiment of the invention illustrated in the accompanying drawings and described in detail hereinafter.

DESCRIPTION OF DRAWINGS

FIGS. 2 and 2a are transverse sectional views of the remote control valve respectively taken as indicated by the arrowed lines 2—2 and 2a—2a of FIG. 1;

FIGS. 3, 6, 7 and 8 are vertical sectional views respectively taken along the arrowed lines 3—3, 6—6, 7—7 and 8—8 of FIGS. 2 and 2a;

FIG. 4 is an enlarged, fragmentary vertical sectional view taken as indicated by the arrowed line 4—4 of FIG. 3;

FIG. 5 is a fragmentary sectional view taken as indicated by the arrowed line 5—5 of FIG. 4.

DETAILED DESCRIPTION OF EXEMPLARY EMBODIMENT OF INVENTION

Figure 1:
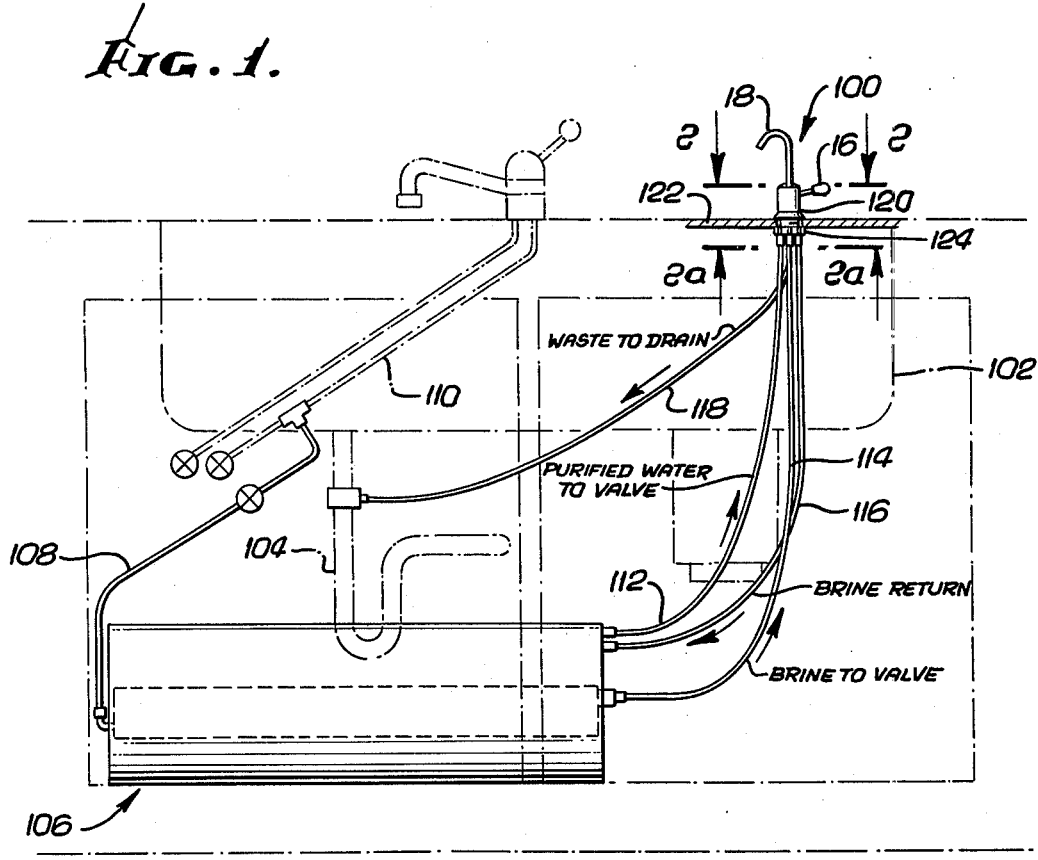
FIG. 1 is a semidiagramatic view showing the remote control valve of the invention connected to a reverse osmosis water purifier in conjunction with a conventional kitchen sink installation.

Initially considering the invention in a general sense, with particular reference to FIG. 1 of the drawings, the remote control valve of the invention is designated generally by the numeral 100 and is shown as mounted adjacent a kitchen sink 102 having a drain 104. Located under the sink 102 is a reverse osmosis water purifier 106 which may, for example, be similar to that disclosed in my aforementioned U.S. Pat. No. 3,719,593. The water purifier 106 is supplied with feed water through a feed water line 108 shown as connected to a cold water line 110 associated with the sink 102.

The remote control valve 100 is connected to corresponding fittings on the water purifier 106 by a purified or product water inlet line 112 and a brine inlet line 114 leading to the control valve, and a brine return line 116 leading from the control valve back to the water purifier. The remote control valve 100 is also connected to the drain 104 by a waste line 118 for a metered flow of brine and excess purified water.

The remote control valve 100 includes a control valve body 120 which is seated on and extends downwardly through a suitable support 122, which may be a counter top, a flange of the sink 102, or the like. The control valve body 120 is clamped to the support 122 by a nut 124 threaded onto the valve body beneath the support 122.

Considering the remote control valve 100 in more detail now, the control valve body 120 is provided with a brine inlet or inlet fitting 9 to which the brine inlet line 114 is connected and which communicates with a poppet valve 3 having a stem 2 equipped with an O-ring 4. A compression spring 5 seated against a retaining ring 6 on the stem 2 biases the valve 3 upwardly against its seat. An actuating lever 7 having a manually graspable knob 16 is seated on the upper end of the stem 2. The actuating lever 7 is provided with a hooked end 7a which engages a fulcrum 25 forming part of the control valve body 120. As will be apparent, the valve 3 is unseated to admit brine under pressure through the brine inlet 9 in response to downward movement of the manual knob 16.

A passage 23 connects the annulus around the valve stem 2 to a passage leading downwardly to a brine return outlet or outlet fitting 24 connected to the brine return line 116. A check valve 12 is adapted to engage a seat 51 to prevent upward brine flow when the valve 3 is opened. When the valve 3 is closed, the check valve 12 is biased downwardly into its open position by a weight 14 and/or a spring 35, thereby permitting upward brine flow past the check valve 12 for a reason to be discussed.

A splash shield 13, FIGS. 3 and 6, directs surges of brine flowing upwardly past the check valve 12 at a metered rate downwardly toward a waste passage 22, FIG. 6, leading to a waste outlet or outlet fitting 27 connected to the drain 104 by the waste line 118. An air vent 29, FIG. 6, communicates with the passage leading to the waste outlet 27.

Figure 2:
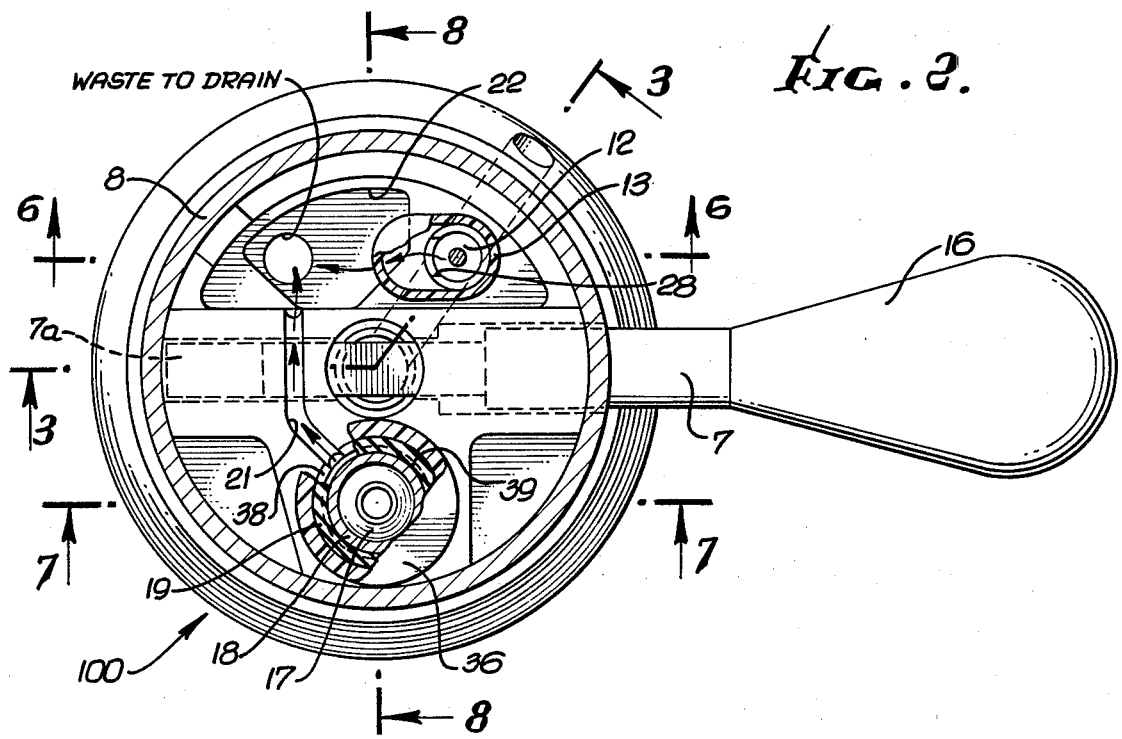
Figure 8:
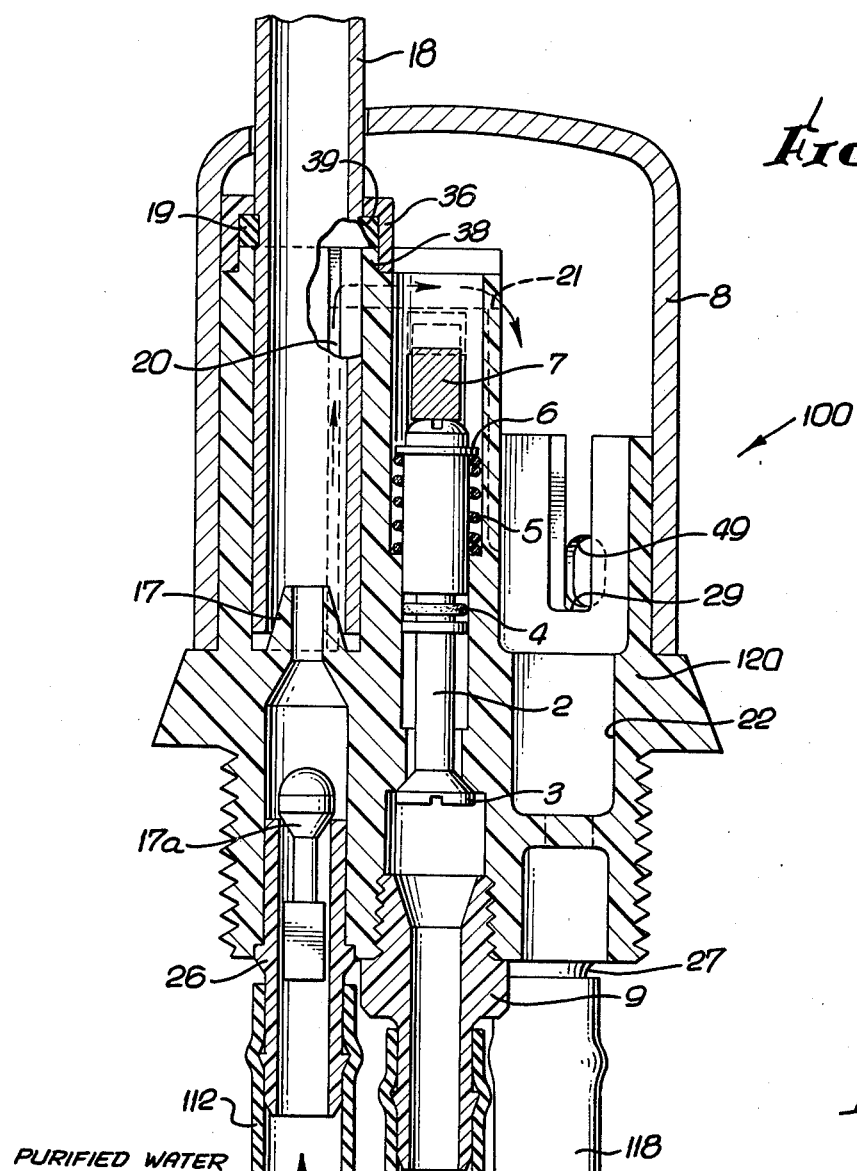

Referring to FIGS. 2a, 7 and 8, the purified water inlet line 112 is connected to a purified water inlet or inlet fitting 26 leading to a purified water ejector nozzle or nozzle means 17 which directs purified water to a discharge outlet or outlet spout 18 through which purified water is dispensed, in a manner to be described hereinafter, when the valve 3 is opened. An upwardly opening check valve 17a prevents reverse flow of purified water, this check valve being biased closed by gravity. As shown in FIGS. 7 and 8, a purified water bleed passage or passage means extends upwardly, externally of the outlet spout 18, from a point below the ejector nozzle 17, and communicates at its upper end with a transverse bleed channel 21, FIG. 2, leading to the waste passage 22. Excess purified water is delivered to the waste passage 22, and thus to the waste outlet 27, by way of the passage 20 and the channel 21, when the valve 3 is closed. Upon opening of the valve 3, purified water is discharged through the ejector nozzle 17 into the outlet spout 18, thereby bypassing the purified water bleed passage 20 and channel 21 when the brine inlet valve 3 is open.

Figure 9:
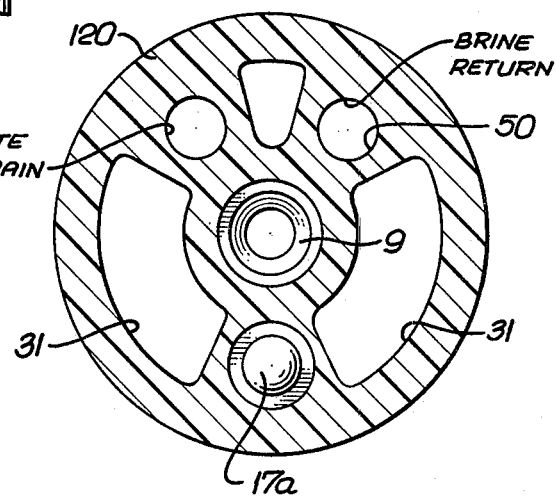
FIG. 9 is a horizontal sectional view taken as indicated by the arrowed line 9—9 of FIG. 3 of the drawings.

The control valve body 120 has a number of cavities 31 formed therein, identified in FIGS. 2a and 9, the purpose of which is to remove all unnecessary material to make the control valve body lighter and more resistant to excessive distortion due to thermal stresses existing during manufacture. The control valve body 120 has telescoped thereover a cover 8 through which the actuating lever 7 and the discharge spout 18 extend.

The foregoing constitutes a partial description of the remote control valve 100 of the invention, covering the major components. The remaining parts of the structure thereof will be identified hereinafter in conjunction with describing the operation of the remote control valve 100 under various conditions.

DELIVERY OF PURIFIED WATER AND PURIFIED WATER BLEED BYPASS

During product water delivery, the purified water from the water inlet line 112 and the purified water inlet 26 flows at high speed through the ejector nozzle 17, which accelerates the purified water so that it bypasses the overflow or bleed passage 20. The accelerated purified water enters the outlet spout 18 and is discharged therefrom to the desired point of use, the discharge pressure being a substantial proportion of the feed water line pressure. (As will be explained hereinafter, the purified water is discharged through the outlet spout 18 in response to opening of the brine inlet valve 3.)

When the brine inlet valve 3 is closed, purified water flow through the ejector nozzle 17 stops, and resumes only when the purified water storage cavity is full to its capacity. When that happens, the purified water flows through the ejector nozzle 17 at very low rate, such low rate being determined and equal to the rate of purified water production by reverse osmosis purifying element 10 incorporated within the purifier 106. Due to the low velocity of the purified water through the ejector nozzle 17, it enters the overflow or bleed passage 20 into the channel 21, which directs the overflow purified water past the air vent 29 into the waste cavity 22. From this cavity, the excess purified water flows through the waste outlet fitting 27 into the drain line 118 leading to the drain 104.

To prevent leakage of purified water around the outlet spout 18, the spout cavity is closed at its upper end, FIGS. 7 and 8, by a cap 36 telescoped over and suitably secured to an annular flange 38 at the top of the control valve body 120. An O-ring 19 is compressed between the cap 36 and the flange 38, and fits into an external annular groove 39 in the discharge spout 18. The O-ring 19 serves not only as a seal, but as a retaining ring to hold the spout 18 in its proper position.

BRINE FLOW CONTROL

Brine emerging from the water purifier 106 flows through the brine inlet line 114 into the brine inlet 9 below the brine inlet valve 3, which is normally closed. Under such conditions, brine entering through the brine inlet 9 flows through a calibrated channel 40, FIGS. 3, 4 and 5, in the exterior of the brine inlet valve. The calibrated channel 40 serves as a brine bleed means for metering brine from the brine inlet 9 through the passage 23 and into a passage 50 below the check valve 12. The brine bled into the cavity 50 below the check valve 12 is at low pressure, and thus cannot return, by way of the brine return outlet 24, to the water purifier 106. Consequently, the brine bled through the calibrated channel 40 flows upwardly past the normally open check valve 12, and is directed downwardly by the splash shield 13 into the waste cavity 22. From this cavity, the metered flow of brine exits through the waste outlet 27, as does the excess purified water, and is directed to the drain 104 by the waste line 118. It will be understood that this metered quantity of brine and the excess purified water are directed to the drain 104 while the brine inlet valve 3 is closed.

PURIFIED WATER DELIVERY TO OUTLET SPOUT

The purified water delivery cycle is initiated by displacing the actuating lever 7 downwardly by means of the manual knob 16, the actuating lever being restricted to upward and downward pivotal movement by a slot therefor in the cover 8. Manual downward movement of the knob 16 causes the actuating lever 7 to pivot about the fulcrum 25 and to displace the valve stem 2 downwardly against the action of the spring 5 to unseat the brine inlet valve 3, as best shown in FIG. 3. Consequently, brine from the water purifier 106 can flow past the brine inlet valve 3 at a high rate, determined by the feed water line pressure in the water purifier. The brine flowing past the brine inlet valve 3 enters the cavity 50 below the check valve 12 by way of the passage 23 and, since the brine is under substantially feed water line pressure, it causes the check valve 12 to seat against the action of the weight 14 and/or the spring 35. Consequently, bleeding of brine to waste is terminated, and all of the brine flow is directed back to the water purifier 106 through the brine return outlet 24 and the brine return line 116. This return of the brine to the water purifier 106 results in the application of substantially feed water line pressure to the purified water reservoir in the water purifier 106, thereby causing the purified water to be delivered to the purified water inlet 26 at substantially feed water line pressure. The ejector nozzle 17 causes the purified water to bypass the purified water bleed passage 20 and to enter and discharge from the outlet spout 18, as hereinbefore explained.

When it is desired to terminate the delivery of purified water to the outlet spout 18, it is merely necessary to release the manual knob 16, whereupon the spring 5 and brine pressure close the brine inlet valve 3. This terminates the brine return to the water purifier 106, thereby removing the external pressure applied to the purified water reservoir therein, and stopping the discharge of purified water from the outlet spout 18. Any excess purified water is directed to the waste outlet 27 through the passage 20 and the channel 21. Also, upon closure of the brine inlet valve 3, the spring 35 and/or the weight 14 open the check valve 12, thereby allowing excess brine, and metered brine flow through the calibrated channel 40, to flow to the waste outlet 27 by way of the waste cavity 22 and the waste outlet 27, the latter being connected by the waste line 118 to the drain 104. In other words, under such conditions, the remote control valve 100 has been restored to its normal, steady state condition, wherein brine is metered to drain from the water purifier 106 and the purified water reservoir in the water purifier is connected to drain to maintain such reservoir at atmospheric pressure so that the reverse osmosis module in the purifier can operate properly.

PREVENTION OF REVERSED FLOW FROM DRAIN

Should it happen that the drain 104 becomes plugged for any reason, the level in the waste cavity 22, FIG. 6, will rise until it reaches the level of the air vent 29 in the control valve body 120 and that of a registering vent 49 in the cover 8. When this occurs, the waste water will be discharged through the openings 29 and 49 and out of the remote control valve 100 to a suitable point of disposal, such as the sink 102. Since the brine bleed exit opening 28, FIG. 6, and the purified water bleed channel 21, FIG. 8, are both located above the vent openings 29 and 49, waste water cannot back up into the purified water inlet 26, the brine inlet 9, or the brine return outlet 24. Consequently, there is no possibility of contamination reaching the water purifier 106.

Although an exemplary embodiment of the invention has been disclosed for illustrative purposes, it will be understood that various changes, modifications and substitutions may be incorporated in that embodiment without departing from the invention as hereinafter claimed.

I claim as my invention:

1. A remote control valve for a reverse osmosis water purifier which is connected to a source of pressurized feed water and produces purified water and brine from the feed water, the purified water being pressurized by the feed water, the purifier having a purified water outlet, a brine outlet and a brine return inlet, the control valve comprising:

a valve body having a purified water inlet with means for connection to the purified water outlet of the purifier, a brine inlet with means for connection to the purifier brine outlet, a brine return outlet with means for connection to the purifier brine return inlet, and a waste outlet with means for connection to a drain;

a purified water discharge outlet connected directly to the purified water inlet, which has a backflow preventing check valve therein;

said brine inlet being coupled to said brine return outlet;

a brine inlet valve mounted in and normally closing said inlet;

manually operable means for opening said brine inlet valve to direct brine through said brine return outlet to the purifier, so as to pressurize the purified water therein to feed water pressure and deliver the purified water to said discharge outlet;

brine bleed means for metering brine from said brine inlet to said waste outlet when the brine inlet valve is closed;

and a purified water bleed outlet between said purified water inlet and said discharge outlet for bleeding excess purified water to said waste outlet.

2. A remote control valve according to claim 1, wherein said purified water inlet has a nozzle therein extending beyond and bypassing said bleed outlet.

3. A remote control valve according to claim 1, wherein said brine bleed means includes a bleed check valve between said brine return outlet and said waste outlet, said bleed check valve being normally open and being moved to a closed position by pressure of brine in the return outlet.

4. A remote control valve according to claim 1, wherein said valve body has an air vent therein between said purified water bleed outlet and said waste outlet.

* * * * *